(12) United States Patent
Janier et al.

(10) Patent No.: US 10,094,434 B2
(45) Date of Patent: Oct. 9, 2018

(54) DEVICE FOR HYDRAULIC CONTROL OF A CLUTCH AND ASSOCIATED VEHICLE

(71) Applicant: RENAULT s.a.s., Boulogne Billancourt (FR)

(72) Inventors: Benoit Janier, Chaville (FR); Vincent Blondeau, Chartres (FR)

(73) Assignee: RENAULT S .A. S., Boulogne-Billancourt (FR)

( * ) Notice: Subject to any disclaimer, the term of this patent is extended or adjusted under 35 U.S.C. 154(b) by 195 days.

(21) Appl. No.: 15/029,539

(22) PCT Filed: Oct. 1, 2014

(86) PCT No.: PCT/FR2014/052487
§ 371 (c)(1),
(2) Date: Apr. 14, 2016

(87) PCT Pub. No.: WO2015/055913
PCT Pub. Date: Apr. 23, 2015

(65) Prior Publication Data
US 2016/0252145 A1    Sep. 1, 2016

(30) Foreign Application Priority Data
Oct. 16, 2013    (FR) ...................................... 13 60056

(51) Int. Cl.
*F16D 48/04*    (2006.01)
*B60K 23/02*    (2006.01)
*F16D 48/02*    (2006.01)

(52) U.S. Cl.
CPC .............. *F16D 48/04* (2013.01); *B60K 23/02* (2013.01); *F16D 2048/023* (2013.01); *F16D 2048/026* (2013.01); *F16D 2048/0224* (2013.01)

(58) Field of Classification Search
CPC ............... F16D 48/04; F16D 2048/026; F16D 2048/023; F16D 2048/0224; B60K 23/02
(Continued)

(56) References Cited

U.S. PATENT DOCUMENTS 4,301,908 A * 11/1981 Fukuda .................. B60K 23/02
188/380
5,070,983 A * 12/1991 Leigh-Monstevens ......................
F16D 25/14
192/109 F

FOREIGN PATENT DOCUMENTS

DE    196 22 572 A1    12/1996
DE    19622572 A1 *    12/1996    ............. B60K 23/02
(Continued)

OTHER PUBLICATIONS

International Search Report dated Feb. 20, 2015 in PCT/FR2014/052487 Filed Oct. 1, 2014.

*Primary Examiner* — Thomas E Lazo
(74) *Attorney, Agent, or Firm* — Oblon, McClelland, Maier & Neustadt, L.L.P.

(57) ABSTRACT

A device for hydraulic control of a clutch for a motor vehicle, including a master cylinder controlled by a clutch pedal, a mechanism supplying the master cylinder with hydraulic fluid, a receiving cylinder for actuation of the clutch, the master cylinder linked to the receiver cylinder by a hydraulic pipe, the cylinder for actuation of the clutch being positioned in a rear of the vehicle and the pedal and the master cylinder being placed at a front of the vehicle, the hydraulic pipe linking the front and rear of the vehicle including a plurality of pipe offset devices along its length to encourage return of air bubbles to the mechanism supplying the master cylinder with hydraulic fluid.

10 Claims, 2 Drawing Sheets

(58) Field of Classification Search
USPC .......................................................... 60/594
See application file for complete search history.

(56) References Cited

FOREIGN PATENT DOCUMENTS

EP          2 522 873  A1    11/2012
EP           2522873   A1 *  11/2012   ............. F16D 48/02

* cited by examiner

DEVICE FOR HYDRAULIC CONTROL OF A CLUTCH AND ASSOCIATED VEHICLE

The invention relates to a device for hydraulic control of a clutch, in particular for a motor vehicle.

A vehicle comprises an engine connected to a gear box via a clutch which may be actuated using a hydraulic control, so as to couple, i.e. engage, or decouple, i.e. disengage, the engine from the gear box.

A device for hydraulic control conventionally comprises a master cylinder controlled by a clutch pedal, the master cylinder being connected by a pipe to a slave cylinder for actuation of the clutch. The control also comprises means for supplying the master cylinder with hydraulic fluid, generally a reservoir containing a brake fluid.

The actuation of the master cylinder by pressing on the clutch pedal causes the displacement of the hydraulic fluid under pressure into the pipe as far as the slave cylinder which then exerts a force on a clutch fork, the clutch fork actuating a clutch release bearing which bears against the disengaging means so as to decouple the engine from the gear box.

When the driver releases the clutch pedal, the master cylinder no longer exerts pressure on the hydraulic fluid. The slave cylinder then returns to its original position and the hydraulic fluid is returned to the master cylinder. A device for hydraulic control of this type is disclosed, for example, in the document DE 195 00 998.

Whilst such a device is generally sealed, it has nevertheless been observed that during operation air bubbles are introduced into the hydraulic fluid, generally via the slave cylinder.

More specifically, air bubbles present in the slave cylinder or trapped in the fluid of the pipe prevent the correct operation of the device for hydraulic control. More specifically, when a driver presses on the clutch pedal and actuates the master cylinder thereby, the air is compressed and the displacement of the master cylinder is thus only partially transmitted to the slave cylinder, which may prevent the disengagement and cause in extreme cases a breakdown leading to the immobilization of the vehicle.

Figure 1:
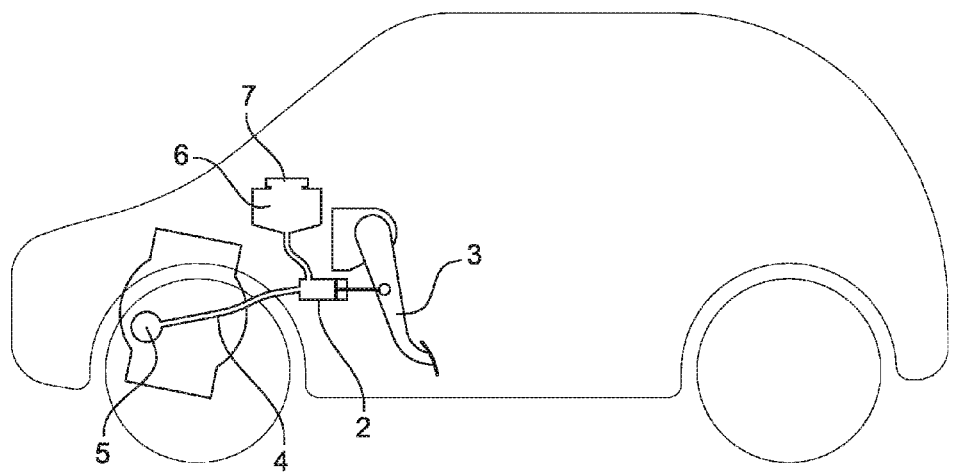

In normal vehicles comprising a front-mounted drive train, as visible in FIG. 1, the master cylinder 2 is generally arranged at a point which is located higher than the slave cylinder 5 so that the bubbles from the slave cylinder naturally rise up into the master cylinder where they are then discharged toward the reservoir 7 for brake fluid 6. Moreover, the length of the pipes 4 is short.

This is not the case for vehicles with a rear-mounted drive train which, in particular, have a longer hydraulic pipe passing from the front of the vehicle to the rear, which increases the possibility of the presence of bubbles in the pipe and makes it more difficult, due to the length of the pipe, to discharge these bubbles toward the master cylinder and then to the reservoir. Thus it is necessary to find a solution to the problem of discharging the air bubbles in the pipes.

The object of the invention, in particular, is to provide a solution to this problem which is simple, efficient and economical.

To this end, the invention proposes a device for hydraulic control of a clutch for a motor vehicle, comprising a master cylinder controlled by a clutch pedal, means for supplying the master cylinder with hydraulic fluid, a slave cylinder for actuation of the clutch, the master cylinder being linked to the actuating slave cylinder by means of a hydraulic pipe, characterized in that the slave cylinder for actuation of the clutch is positioned in the rear of the vehicle and the pedal and the master cylinder are placed at the front of the vehicle and in that the hydraulic pipe linking the rear to the front of the vehicle comprises a plurality of pipe offset devices along its length, said pipe offset device being designed to trap the air bubbles present in the hydraulic pipe and said plurality of pipe offset devices being designed to promote the rising of air bubbles as far as the means for supplying the master cylinder with hydraulic fluid.

The air bubbles are trapped by the pipe offset devices and they are discharged during the operation of the clutch by rising progressively along the pipe as far as the brake fluid reservoir, due to the plurality of pipe offset devices. Thus it is not necessary to have costly devices, such as a separate drainage stage, with in particular additional equipment for supplementary drainage, for example drainage pumps, or for example additional circuits for separate flow and return pipes.

In the preferred embodiments of the invention, reference is also made to either one and/or the other of the following arrangements taken individually or in combination:
  the offset device is composed of an upstream tubular portion and a downstream tubular portion, which are successive and in communication, each tubular portion having a radius and a separate central axis in the same direction, the distance between the two central axes of the tubular portions being less than the sum of the radii of the successive upstream and downstream tubular portions so that the outer surfaces of the tubular portions have an overlapping area.
  the two tubular portions of the offset device communicate by means of a common recess formed in a lower part of the outer surface of the upstream tubular portion and in the upper part of the outer surface of the downstream tubular portion, via which the hydraulic fluid circulates.
  the recess has a width which is greater than or equal to the sum of the radii of the upstream and downstream tubular portions.
  the hydraulic pipe comprises at least two successive offset devices in the same longitudinal plane of the vehicle, the offset device located in the vicinity of the pedal being higher than the device located in the vicinity of the slave cylinder.
  the device for hydraulic control of a clutch for a motor vehicle comprises at least three successive offset devices.
  the device for hydraulic control of a clutch for a motor vehicle comprises at least four successive offset devices.
  the pipe portion connecting two successive offset devices comprises a volume of hydraulic fluid of between 70 and 90% of the volume of hydraulic fluid displaced when pressing on the pedal.
  a length of pipe portion between two successive offset modules is between 400 mm and 600 mm.

The invention further relates to a motor vehicle comprising a clutch actuated by a device for hydraulic control of the aforementioned type.

Figure 2:
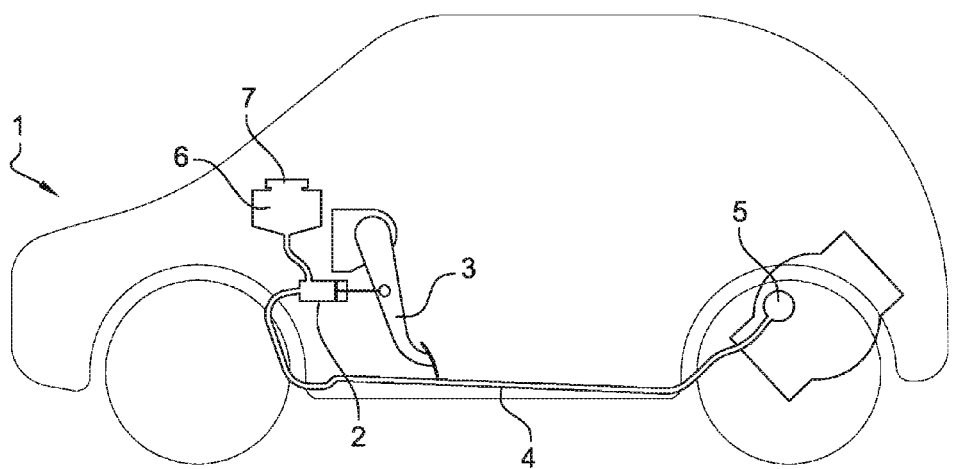
Figure 3:
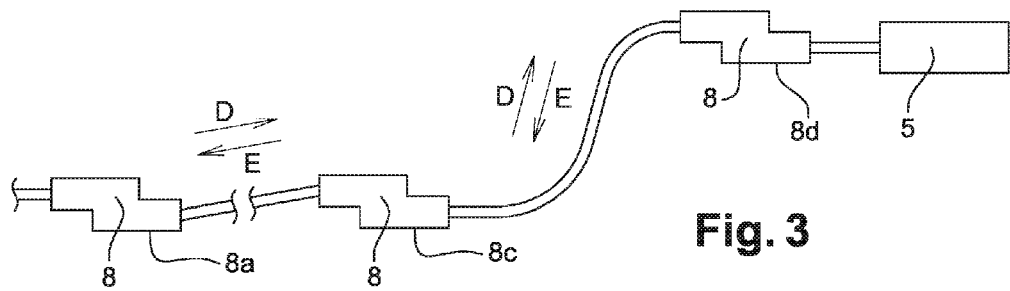
Figure 4:
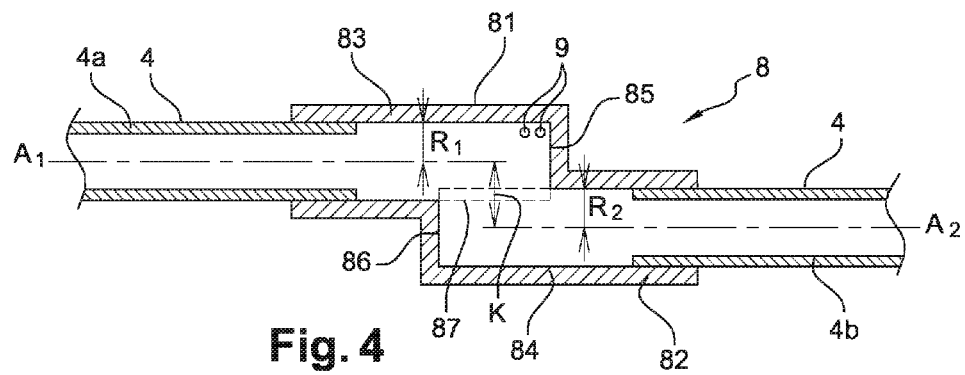
Figure 5:
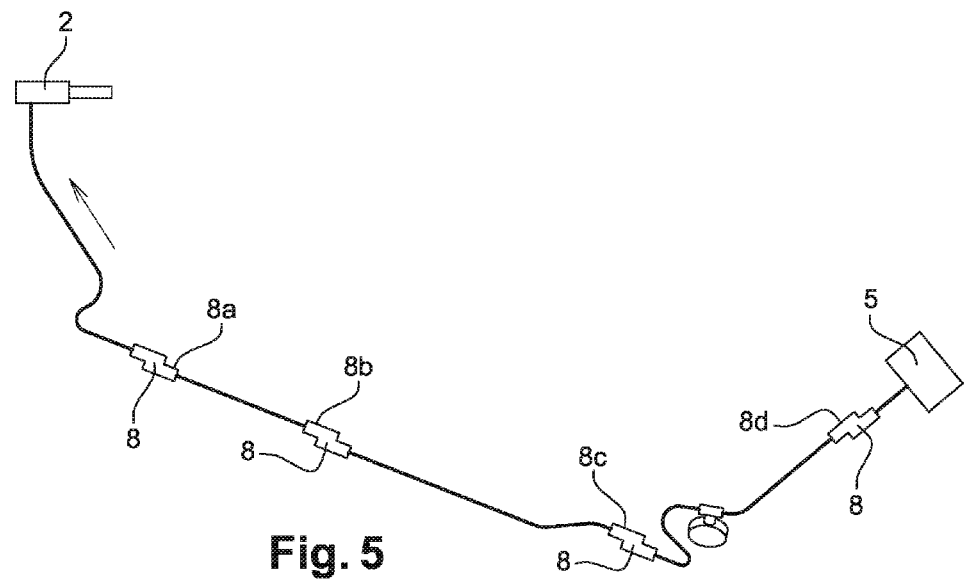

The invention will be understood more clearly and further features and advantages of the invention will become apparent during the following description made by way of non-limiting example of one or more of the embodiments thereof, with reference to the accompanying drawings in which:

FIG. 1 is a schematic view of a motor vehicle comprising a clutch actuated by a device for hydraulic control of the prior art, FIG. 2 is a schematic view of a motor vehicle comprising a clutch actuated by a device according to the invention, FIG. 3 is a detailed schematic view of the pipe of the hydraulic device according to the invention, FIG. 4 is a detailed view of an offset device constituting the invention, FIG. 5 is a view of the assembly of the device for hydraulic control according to the invention.

Within the context of the present application, the terms "front", "rear", "left" and "right" are understood with reference to the usual coordinates of motor vehicles comprising a first longitudinal axis X, which is horizontal and oriented from the rear to the front, a transverse axis Y and a vertical axis oriented from the bottom to the top. The axes X, Y define a horizontal plane.

Moreover, in the various figures, the same reference numerals denote identical or similar elements.

FIG. 2 shows a motor vehicle comprising an engine located at the rear part of the vehicle, connected to a gear box via a clutch (not shown). The clutch is actuated by a device for hydraulic control 1 comprising at the front a master cylinder 2 controlled by a clutch pedal 3 and connected by a pipe 4 to a slave cylinder 5 for actuation of the clutch located at the rear of the vehicle. The master cylinder 2 is supplied by a reservoir 7, located above the master cylinder 2 and containing brake fluid 6 at atmospheric pressure.

When a driver presses on the clutch pedal 3, the master cylinder 2 pushes back the hydraulic fluid 6 in the direction of the cylinder 5, a clutch release bearing acting on a diaphragm of the clutch.

The thrust force transmitted to the diaphragm causes the decoupling of the engine relative to the gear box: this refers to the disengagement operation. When the driver wishes to engage the clutch again, i.e. couple the engine to the gear box, the driver releases the clutch pedal 3, the restoring force then exerted by the diaphragm on the slave cylinder 5 tending to push back the hydraulic fluid in the direction of the master cylinder 2, the two cylinders 2, 5 thus returning to their original position, i.e. their resting position. In this example, the clutch is in this case a clutch which is usually closed, which means that in the absence of action on the clutch pedal 3 the engine 1 is coupled to the gear box.

As indicated above, air bubbles are able to penetrate the hydraulic circuit, in particular in the region of the slave cylinder 5 which, for vehicles with a rear-mounted engine, is located at the rear of the vehicle.

More specifically, the presence of air bubbles in the hydraulic circuit prevents the correct operation of the hydraulic control. It is necessary to discharge said air bubbles to guarantee the correct operation of the system. This discharge is only able to take place in the direction of the master cylinder 2 and the reservoir 7, and it is carried out by means of the succession 8a, 8b, 8c, 8d of pipe offset devices 8 judiciously placed on the circuit 4 of hydraulic fluid 6, as may be seen in FIG. 3. There is only one circuit which connects the pipe offset devices. Thus the circulation in the pipe is carried out in both directions, as the arrows D and E of FIG. 3 indicate.

The offset devices are all identical. A single example of an offset device 8 is shown in FIG. 4. The offset device 8 is in the form of a module which is placed on the hydraulic pipe 4, this module comprising a first tubular portion and a second tubular portion of the same diameter, which are successive, offset and in communication with one another. One of the tubular portions constitutes the upstream portion 81 and the other tubular portion constitutes the downstream portion 82 of the pipe passing through the offset device. Each tubular portion has a radius R1 and R2, in addition to a separate central axis of revolution A1, A2 in the same direction. The distance K between the two axes is less than or equal to the sum S of the radii R1 and R2 of the upstream and downstream tubular portions. Due to this limited distance between the two axes and due to the fact that the two central axes are separate, the two pipes are offset whilst having their tubular outer surfaces partially superposed. This partial superposition of the tubular outer surfaces is characteristic of the offset device and permits the offset device 8 to be distinguished from a simple angled shape of the hydraulic pipe. Thus, the partial superposition of the two upstream and downstream tubular portions constitutes the offset module.

Preferably, the upstream and downstream pipes may have the same radius R.

Inside the offset device, so that the fluid circulates from the upstream portion 81 to the downstream portion 82, a recess 87 has been made in the two outer surfaces of the two upstream 81 and downstream 82 tubular portions. This recess 87 is made in the lower part of the outer surface 83 of the upstream pipe 81 and in the upper part of the outer surface 84 of the downstream pipe 82. This recess 87 is the location of the offset of the pipe, the location where the two pipes overlap one another and via which the hydraulic fluid 6 circulates. This recess 87 is at least equal to or substantially wider than the sum S of the radii R1 and R2 of the upstream and downstream tubular portions in order to facilitate the displacement of the hydraulic fluid in the inside of the offset module.

The displacement of the fluid inside the offset device, more particularly at the location of the recess 87, has a component oriented along the offset, namely perpendicular to the longitudinal direction of the pipe, due to the shape of the offset of the pipe.

In the vehicle with the rear-mounted engine, the pipes pass from the front to the rear and, in principle, have a component along the horizontal plane. The offset is essentially implemented perpendicular to the pipe, in the vertical direction z.

As seen in FIG. 4, the upstream tubular portion 81 is terminated by a transverse surface 85 bordering the recess 87 of the downstream side. The downstream tubular portion 82 starts with a transverse surface 86 relative to the pipe bordering the recess 87 of the upstream side.

The transverse surface 85 of the upstream pipe 81 permits the air bubbles 9 of the fluid to be trapped. The air bubbles 9 collect in the vicinity of this surface. As they are more lightweight, the air bubbles 9 naturally rise up in the direction of the pipe offset and in the vertical direction, i.e. upwardly, above the recess 87, into the offset area, namely in the part of the upstream pipe above the downstream pipe. The air bubbles are then lodged in the top of the upstream pipe.

The bubbles are trapped by the transverse stop surface 85 of the upstream pipe portion 81 and remain on the upstream side of the recess. They are no longer able to be displaced in the direction of the slave cylinder as they are retained by the transverse stop surface 85 of the upstream pipe. They are also held in the upstream pipe as this is higher than the downstream pipe, due to the offset in height, which creates a threshold effect. When fluid 6 is displaced inside the pipe 4 in the direction D, when the pedal is pressed, the hydraulic fluid 6 is displaced by the pedal 3 to the slave cylinder 5 and the air bubbles present in the circuit are trapped by the transverse surface 85 of the upstream pipe and are no longer displaced in the direction of the slave cylinder 5.

In contrast, when the clutch pedal 3 is released, the air bubbles follow the displacement of the fluid in the direction E and are conducted in the upstream direction, they are not able to cross the threshold vertically and are displaced over a distance equivalent to the volume of displaced liquid, they cross the distances separating several offset modules 8 and are progressively trapped by a new offset device. They thus progressively rise over the entire hydraulic pipe due to the pressing movement on the clutch pedal, stopping at the offset devices which are present along the length.

As visible in FIG. 4, the pipe offset device 8 is connected upstream to the pipe portion 4a originating from the pedal and the master cylinder and is connected downstream to the pipe portion 4b originating from the clutch slave cylinder. By "upstream" it is understood that the portion of pipe originating from the pedal and the master cylinder is higher than the portion of pipe originating from the clutch slave cylinder. The connection between the offset device and the portion of hydraulic pipe originating from the pedal is implemented by the insertion of the pipe inside the upstream portion of the pipe of the offset module, and the same applies to the connection between the portion of hydraulic pipe originating from the slave cylinder and the downstream portion of the pipe of the offset device.

In the embodiment of FIG. 5, the hydraulic pipe comprises at least two successive offset modules 8a, 8b in the same longitudinal plane of the vehicle, and this relates in particular to the offset devices located in the flat area below the body. A slight incline is thus provided between the devices, the device located in the vicinity of the pedal being located higher than the device located in the vicinity of the clutch slave cylinder.

According to the length of the hydraulic pipe, said pipe may comprise at least three or four successive offset modules 8a, 8b, 8c and 8d. In this case, the portion of pipe connecting two successive offset modules 8a, 8b, 8c, 8d comprises a volume of hydraulic fluid 6 of between 70 and 90% of the volume of hydraulic fluid 6 displaced when pressing on the pedal 3. Such a volume permits the air bubbles to rise up in at least one portion separating two modules when pressing/releasing the pedal.

Taking into account the diameter of the pipe, usually approximately 3 to 4 mm, the length of pipe portion between two successive offset modules 8a, 8b, 8c, 8d is substantially between 400 mm and 600 mm.

The operation of this control device will now be described in detail:

Pressing on the clutch pedal 3 causes the displacement of the fluid from the pedal 3 to the clutch slave cylinder 5. Inside the offset device, the air bubbles 9 remain trapped by the transverse stop surface 85 of the upstream pipe 81 whilst the fluid flows from the upstream pipe 81 to the downstream pipe 82.

When the pedal is released, the hydraulic fluid is displaced from the slave cylinder 5 to the pedal 3. The air bubbles 9, as they do not have a threshold to cross in this direction, are displaced from their temporary housing toward the pedal. An action on the pedal permits a volume which is equal to or greater than the fluid stored in the pipe to be displaced between two offset devices. When the pedal is released, the minimum displacement of the air bubbles 9 is by a distance separating two offset devices 8. The air bubbles thus progressively rise up in the pipe as far as the first offset device placed on the pipe originating from the master cylinder. This master cylinder is located below the reservoir and during a final pressing/release of the pedal, said air bubbles naturally rise up as far as the reservoir 7 or they are then discharged.

The invention thus proposes a device for hydraulic control of a clutch permitting the discharge of air bubbles during the operation thereof in a simple and efficient manner. Thus it is guaranteed that the air bubbles present in the connecting pipe, whatever their position, are conducted upstream of the hydraulic pipe as far as the reservoir where they are then discharged due to the successive actions of engagement/disengagement.

The invention claimed is:

1. A device for hydraulic control of a clutch for a motor vehicle, comprising:
   a master cylinder controlled by a clutch pedal;
   a reservoir for supplying the master cylinder with hydraulic fluid; and
   a slave cylinder for actuation of the clutch, the master cylinder being linked to the actuating slave cylinder by a hydraulic pipe,
   wherein the slave cylinder for actuation of the clutch is positioned in a rear of the vehicle, the clutch pedal and the master cylinder are placed at a front of the vehicle, and the hydraulic pipe linking the rear to the front of the vehicle comprises a plurality of pipe offset devices along a length of the hydraulic pipe, and
   wherein the pipe offset device is configured to trap air bubbles present in the hydraulic pipe and promote rising of air bubbles as far as the reservoir, the pipe offset device includes an upstream tubular portion and a downstream tubular portion, which are successive and in communication, each tubular portion having a radius and a separate central axis in a same direction, a distance between two central axes of the tubular portions being less than a sum of the radii of the successive upstream and downstream tubular portions so that outer surfaces of the tubular portions have an overlapping area.

2. The device for hydraulic control of the clutch for the motor vehicle as claimed in claim 1, wherein the two tubular portions of the offset device communicate by a common recess formed in a lower part of the outer surface of the upstream tubular portion and in an upper part of the outer surface of the downstream tubular portion, via which the hydraulic fluid circulates.

3. The device for hydraulic control of the clutch for the motor vehicle as claimed in claim 2, wherein the common recess has a width which is greater than or equal to the sum of the radii of the upstream and downstream tubular portions.

4. The device for hydraulic control of the clutch for the motor vehicle as claimed in claim 1, wherein the hydraulic pipe comprises at least two successive pipe offset devices in a same longitudinal plane of the vehicle, one of the pipe offset device located in vicinity of the pedal being higher than one of the pipe offset device located in vicinity of the slave cylinder.

5. The device for hydraulic control of the clutch for the motor vehicle as claimed in claim 1, further comprising at least three successive pipe offset devices.

6. The device for hydraulic control of the clutch for the motor vehicle as claimed in claim 1, further comprising at least four successive pipe offset devices.

7. The device for hydraulic control of the clutch for the motor vehicle as claimed in claim 1, wherein the hydraulic pipe portion connecting two successive pipe offset devices comprises a volume of the hydraulic fluid of between 70% and 90% of a volume of the hydraulic fluid displaced when pressing on the clutch pedal.

8. The device for hydraulic control of the clutch for the motor vehicle as claimed in claim 1, wherein the length of the hydraulic pipe portion between two successive pipe offset devices is between 400 mm and 600 mm.

9. A vehicle comprising the device for hydraulic control of the clutch as claimed in claim 1.

10. A device for hydraulic control of a clutch for a motor vehicle, comprising:
- a master cylinder controlled by a clutch pedal;
- a reservoir for supplying the master cylinder with hydraulic fluid; and
- a slave cylinder for actuation of the clutch, the master cylinder being linked to the actuating slave cylinder by a hydraulic pipe,
- wherein the slave cylinder for actuation of the clutch is positioned at a rear of the vehicle, the clutch pedal and the master cylinder are placed at a front of the vehicle, and the hydraulic pipe linking the rear to the front of the vehicle includes a plurality of pipe offset devices along a length of the hydraulic pipe,
- wherein the hydraulic pipe includes at least two successive offset devices in a same longitudinal plane of the vehicle, one of the offset device located in vicinity of the clutch pedal being higher than one of the offset device located in vicinity of the slave cylinder, and
- wherein the pipe offset device is configured to trap air bubbles present in the hydraulic pipe and promote rising of air bubbles as far as the reservoir.

* * * * *